United States Patent Office 3,043,800
Patented July 10, 1962

3,043,800
HIGH MOLECULAR WEIGHT LINEAR ALKALI-SOLUBLE POLYCARBONATES AND PROCESS FOR THEIR MANUFACTURE
Hermann Schnell, Krefeld-Uerdingen, and Ludwig Bottenbruch, Krefeld-Bockum, Germany, assignors to Farbenfabriken Bayer Aktiengesellschaft, Leverkusen, Germany, a corporation of Germany
No Drawing. Filed May 28, 1957, Ser. No. 662,013
Claims priority, application Germany June 2, 1956
9 Claims. (Cl. 260—47)

High molecular weight linear polycarbonates may be produced of a great number of dihydroxy compounds, that is of aliphatic, cycloaliphatic and aromatic dihydroxy compounds.

For example there may be mentioned, as aliphatic dihydroxy compounds: ethylene glycol, diethylene glycol, triethylene glycol, polyethylene glycol, thiodiglycol, ethylene dithiodiglycol, the di-, and polyglycols produced from propyleneoxide-1,2, o, m, or p-xylylene glycol, propanediol-1,3, butanediol-1,3, butanediol-1,4, 2-methylpropanediol-1,3, pentanediol-1,5, 2-ethylpropanediol-1,3, hexanediol-1,6, octanediol-1,8, 1-ethylhexanediol-1,3, and decanediol-1,10.

As cycloaliphatic dihydroxy compounds: cyclohexanediol-1,4, cyclohexanediol-1,2, 2,2-(4,4'-dihydroxy-dicyclohexylene)-propane and 2,6-dihydroxydecahydronaphthalene, as aromatic dihydroxy compounds: hydroquinone, resorcinol, pyrocatechol, 4,4'-dihydroxydiphenyl, 2,2'-dihydroxydiphenyl, 1,4-dihydroxynaphthalene, 1,6-dihydroxynaphthalene, 2,6-dihydroxynaphthalene, 1,2-dihydroxynaphthalene, 1,5-dihydroxynaphthalene, dihydroxyanthracene, 2,2-dihydroxydinaphthyl-1,1' and o, m, p-hydroxybenzylalcohol.

Preferred classes of aromatic dihydroxy compounds are the di-monohydroxy arylene sulphones and particularly the di-monohydroxy arylene alkanes, such as 4,4'-dihydroxydiphenylene sulphone, 2,2'-dihydroxydiphenylene sulphone, 3,3'-dihydroxyldiphenylene sulphone, 4,4'-dihydroxy-2,2'-dimethyl-diphenylene sulphone, 4,4'-dihydroxy - 3,3' - dimethyl-diphenylene sulphone, 2,2'-dihydroxy-4,4'-dimethyldiphenylene sulphone, 4,4'-dihydroxy-2,2'-diethyldiphenylene sulphone, 4,4'-dihydroxy-3,3'-diethyldiphenylene sulphone, 4,4'-dihydroxy-2,2'-di-tert. butyl-diphenylene sulphone, 4,4'-dihydroxy-3,3'-di-tert. butyl-diphenylene sulphone and 2,2'-dihydroxy-1,1'-dinaphthylene sulphone, 4,4'-dihydroxy-diphenylene-methane, 1,1-(4,4'-dihydroxy-diphenylene)-ethane,
1,1-(4,4'-dihydroxy-diphenylene)-propane,
1,1-(4,4'-dihydroxy-diphenylene)-butane,
1,1-(4,4'-dihydroxy-diphenylene)-2-methyl-propane,
1,1-(4,4'-dihydroxy-diphenylene)-heptane,
1,1-(4,4'-dihydroxy-diphenylene)-1-phenyl-methane,
(4,4'-dihydroxy-diphenylene)-(4-methyl-phenylene)-methane,
(4,4'-dihydroxy-diphenylene)-(4-ethyl-phenylene)-methane,
(4,4'-dihydroxy-diphenylene)-(4-isopropyl-phenylene)-methane,
(4,4'-dihydroxy-diphenylene)-(4-butyl-phenylene)-methane,
(4,4'-dihydroxy-diphenylene)-benzyl-methane,
(4,4'-dihydroxy-diphenylene)-α-furyl-methane,
2,2-(4,4'-dihydroxy-diphenylene)-propane,
2,2-(4,4'-dihydroxy-diphenylene)-butane,
2,2-(4,4'-dihydroxy-diphenylene)-pentane (melting point 149–150° C.),
2,2-(4,4'-dihydroxy-diphenylene)-4-methyl-pentane,
2,2-(4,4'-dihydroxy-diphenylene)-heptane (boiling point 198–200° C. under 0.3 mm. mercury gauge),
2,2-(4,4'-dihydroxy-diphenylene)-octane,
2,2-(4,4'-dihydroxy-diphenylene)-nonane (melting point 68° C.),
1,1-(4,4'-dihydroxy-diphenylene)-1-phenyl-ethane,
(4,4'-dihydroxy-diphenylene)-1-(α-furyl)-ethane,
3,3-(4,4'-dihydroxy-diphenylene)-pentane,
4,4-(4,4'-dihydroxy-diphenylene)-heptane,
1,1-(4,4'-dihydroxy-diphenylene)-cyclopentane,
1,1-(4,4'-dihydroxy-diphenylene)-cyclohexane,
2,2-(4,4'-dihydroxy-diphenylene)-decahydronaphthalene, (melting point 181° C.),
2,2-(4,4'-dihydroxy-3,3'-dicyclohexyl-diphenylene)-propane (melting point 144–146° C.),
2,2-(4,4'-dihydroxy-3-methyl-diphenylene)-propane (melting point 114° C.),
2,2-(5,5'-dihydroxy-3-isopropyl-diphenylene)-butane,
1,1-(4,4'-dihydroxy-3,3'-dimethyl-diphenylene)-cyclohexane,
2,2-(4,4'-dihydroxy-3,3'-dibutyl-diphenylene)-propane,
2,2-(4,4'-dihydroxy-3,3'-diphenyl-diphenylene)-propane,
2,2-(4,4'-dihydroxy-2,2'-dimethyl-diphenylene)-propane,
1,1-(4,4-dihydroxy-3,3'-dimethyl-6,6'-dibutyl-diphenylene)-butane,
1,1-(4,4'dihydroxy-3,3'-dimethyl-6-6'-di-tert.butyl-diphenylene)-ethane,
1,1-(4,4'dihydroxy-3,3'-dimethyl-6,6'-di-tert.butyl-diphenylene)-propane,
1,1-(4,4'-dihydroxy-3,3'-dimethyl-6,6'-di-tert.butyl-diphenylene)-butane,
1,1-(4,4'-dihydroxy-3,3'-dimethyl-6,6'-di-tert.butyl-diphenylene)-isobutane,
1,1-(4,4'-dihydroxy-3,3'-dimethyl-6,6'-di-tert.butyl-diphenylene)-heptane,
1,1-(4,4'-dihydroxy-3,3'-dimethyl-6,6'-di-tert.butyl-diphenylene)-1-phenyl-methane,
1,1-(4,4'-dihydroxy-3,3'-dimethyl-6,6'-di-tert.butyl-diphenylene)-2-methyl-pentane,
1,1-(4,4'-dihydroxy-3,3'-dimethyl-6,6'-di-tert.butyl-diphenylene)-2-ethyl-hexane, and
1,1-(4,4'-dihydroxy-3,3'-dimethyl-6,6'-di-tert.amyl-diphenylene)-butane,
2,2-(4,4'-dihydroxy-dinaphthylene)-propane and
1,1-(4,4'-dihydroxy-dinaphthylene)-cyclohexane.

Among the great number of suitable di-monohydroxy arylene alkanes the 4,4'-dihydroxy-diphenylene alkanes are preferred, especially the 2,2-(4,4'-dihydroxy-diphenylene-propane and the 1,1-(4,4'-dihydroxy-diphenylene)-cyclo hexane.

In some cases mixed polycarbonates prepared of at least two different dihydroxy compounds, especially such of at least one aromatic and at least one aliphatic dihydroxy compound, yield products with special properties.

The polycarbonates can be produced for example by introducing phosgene into solutions of dihydroxy compounds or of mixtures of the aforesaid dihydroxy compounds in organic bases, such as dimethylaniline, diethylaniline, trimethylamine, and pyridine, or in indifferent organic solvents, such as petrol, ligroin, cyclohexane, methylcyclohexane, benzene, toluene, xylene, chloroform, methylenechloride, carbon tetrachloride, trichloroethylene, dichloroethane, methylacetate, and ethylacetate, with addition of an acid-binding agent, e.g. tertiary amines.

A process particularly suitable for producing polycarbonates consists in introducing phosgene into the aqueous solution or suspension of alkali or alkaline earth metal salts, such as lithium, sodium, potassium, and calcium salts of the dihydroxy compounds, preferably in the presence of an excess of a base, such as lithium, sodium, potassium, and calcium hydroxide or carbonate. The polycarbonate then precipitates out from the aqueous solution.

The conversion in the aqueous solution is promoted by the addition of reaction inert solvents of the kind mentioned above which are capable of dissolving phosgene and eventually the produced polycarbonate.

The reaction conditions should be so that one mole of the phosgene reacts with one mole of the dihydroxy compounds. Suitable temperatures are from about 0° C. to 100° C.

It is also possible to react bis-chloro-carbonates of dihydroxy compounds, with the aforementioned dihydroxy compounds. The condensation proceeds suitably in the presence of inert solvents, and acid-binding materials, e.g. tertiary amines.

When using phosgene or bis-chlorocarbonic acid esters as derivatives of the carbonic acid in producing polycarbonates catalysts also may be advantageous. Such catalysts are for instance tertiary or quaternary organic bases or salts thereof, such as trimethylamine, triethylamine, dimethylaniline, diethylaniline, dimethylcyclohexylamine, and pyridine, or for instance the corresponding hydrochlorides, and tetramethylammonium hydroxide, triethyloctadecylammoniumchloride, trimethyl-benzylammoniumfluoride, triethyl-benzylammoniumchloride, dimethyl - dodecylammoniumchloride, dimethylbenzylphenylammoniumchloride, trimethylcyclohexylammoniumbromide, and N-methylpyridiniumchloride, in amounts from about 0.05 to about 5 percent by weight. These compounds may be added to the reaction mixture before or during the reaction.

Furthermore in some of these case it is preferable to add surface active agents, such as alkali metal salts of higher fatty acids or of sulphonic acids of higher aliphatic or of aromatic hydrocarbons and polyoxyethylated alcohols and phenols. Greater amounts of the quaternary ammonium bases mentioned above, too, act as such surface active agents.

In the production of polycarbonates according to the various processes it further is advantageous to employ small amounts of reducing agents, for example sodium or potassium sulphide, sulphite, and dithionite, or free phenol and p-tert.butyl-phenol.

By adding monofunctional compounds which are capable of reacting with phosgene or with the endgroups of the polycarbonates consisting of the chlorocarbonic acid ester group and which terminate the chains, such as the phenols, for instance, the phenol, the tert.butylphenyl, the cyclohexylphenyl, and 2,2-(4,4'-dihydroxyphenylene-4'-methoxyphenylene)-propane further aniline and methylaniline, it is possible to regulate the molecular weight of the polycarbonates in wide limits.

Typical processes for preparing high molecular weight polycarbonates mentioned above are described in the following examples; the parts are by weight.

*Example 1*

Into a mixture of 137.6 parts of 2,2-(4,4'-dihydroxydiphenylene)-propane, 66.9 parts of caustic soda, 615 parts of water, 330 parts of methylenechloride, 0.12 part of sodium dithionite, and 0.1 part of p-tert.butylphenol, 71.5 parts of phosgene are introduced with stirring at about 25° C. during two hours. Then 3 parts of triethylbenzylammoniumchloride are added while continuing stirring the mixture at room temperature for about 2 hours. After this time the solution of the polycarbonate in the methylenechloride is high viscous. After washing the mixture with water and evaporating the solvent a colourless, elastic plastic material is obtained. The K-value is 63.0 corresponding to an average molecular weight of 45,000. The theoretical average molecular weight is 47,700.

*Example 2*

To a mixture of 19.65 parts of 1,1-(4,4'-dihydroxydiphenylene)-cyclohexane-bis-chlorocarbonic acid ester and 12.86 parts of 1,1-(4,4'-dihydroxy-diphenylene)-cyclohexane dissolved in 350 parts of methylene chloride there is added drop by drop with stirring a solution of 11.85 parts of pyridine in 55 parts of methylene chloride at 0° C. over a period of 60 minutes. After the mixture is stirred at room temperature for several hours it is shaken out with water and dried. After evaporation of the solvent there remains a colourless clear tough plastic material with a softening point of 180° C.

Further special examples for producing high molecular weight thermoplastic polycarbonates are given in our copending applications Serial Nos. 461,938, 557,256, 572,793, 572,802, 596,398 and 614,340.

The polycarbonates are elastic thermoplastic materials whose softening point or melting point and physical properties greatly depend on the kind of the dihydroxy compounds used. In general they are soluble in a variety of organic solvents such as methylene chloride, chloroform and pyridine; some are soluble in aromatic hydrocarbons, such as benzene, toluene, and o, m, and p-xylene or in esters, such as ethyl or butyl acetate, or in ketones, such as acetone and cyclohexanone, or in phenols, such as phenol and o, m, or p-cresol, and can be worked up from solutions into shaped articles, such as films, fibres and the like, or into lacquer coatings. They melt without decomposition and can, therefore, be worked up into useful shaped articles or coatings by pressing, flame-spraying and the like.

It has now been found that high molecular weight linear, film-forming polycarbonates which are soluble not only in the organic solvents mentioned above, but also in aqueous alkali-solutions, are obtainable by reacting in the manner described above aliphatic, cycloaliphatic, araliphatic or aromatic dihydroxy compounds containing acid groups, or mixtures of such compounds, optionally in admixture with dihydroxy compounds without acid groups, with carbonic acid chlorides that is with bis-chloro-carbonic acid esters of dihydroxy compounds or with phosgene. It is surprising that the presence in these dihydroxy compounds of acid groups such as the carboxylic or sulphonic acid group, practically does not interfere with the reaction to give high molecular weight polycarbonates.

Dihydroxy compounds containing acid groups according to the invention are especially dihydroxy-carboxylic acids such as tartaric acid, dihydroxy-stearic acids, 2,5-dihydroxy-cyclohexane carboxylic acid, 4,4'-dihydroxy-dicyclohexyl carboxylic acid-(2,2'), 1,5-dihydroxy benzoic acid, 3,6-dihydroxybenzene-dicarboxylic-acid-(1,2), 4,4'-dihydroxydiphenyl-dicarboxylic acid-(2,2'), and particularly di-monohydroxyarylene alkanes containing carboxyl groups such as 4,4'-dihydroxy-3,3'-dicarboxy-diphenylene-methane, 4,4'-dihydroxy-3,3'-dicarboxy-5,5-dimethyl diphenylene-methane, further e.g. dihydroxysulphonic acids such as 1,4-dihydroxybenzene-sulphonic acid-(2), 1,6-dihydroxy-naphthalene-sulphonic acid-(3),4,4'-dihydroxy-diphenyl-disulphonic acid- (2,2') or 2,2-[4,4'-dihydroxy-diphenylene-disulphonic acid-(3,3()]-propane.

Other dihydroxy compounds which in addition may be used, if desired, according to the invention are the same as known for the production of polycarbonates as described above.

Thus the conversion of the aforesaid dihydroxy compounds into the polycarbonates may be effected, for example, by introducing phosgene into a solution or suspension of the dihydroxy compounds in an inert organic solvent such as methylene chloride, benzene or acetone, with the addition of acid-binding agents such as tertiary organic amines, optionally also in aqueous alkalies, or by adding a solution of phosgene dropwise in an inert organic solvent. It is also possible to react the dihydroxy compounds containing acid groups, if desired in admixture with other dihydroxy compounds, with bis-chlorocarbonic acid esters of dihydroxy compounds such as glycol-bis-chlorocarbonic acid ester, butanediol-1,4-bis-chlorocarbonic acid ester, hydroquinone-bis-chlorocarbonic acid ester, 4,4'-dihydroxydiphenylene-bis-chlorocarbonic acid ester or 2,2-(4,4'-dihydroxy-diphenylene)-propane-bis-chlorocarbonic acid ester, in the presence of inert organic solvents with the addition of acid-binding agents such as tertiary organic amines.

The working up of the reaction mixture may be effected when operating in the presence of acid-binding agents and organic solvents such as methylene chloride or benzene, in such a manner that the reaction mixture is dissolved cold in dilute sodium hydroxide solution, the organic layer separated, the aqueous layer filtered off and the polycarbonate precipitated from the filtrate by acidification, or that the organic solvent is distilled off from the reaction mixture upon acidification with dilute hydrochloric acid and the polycarbonate filtered off.

The new polycarbonates are soluble in addition to a number of organic solvents such as acetone, tetrahydrofurane, dioxane, dimethyl formamide, mixture of methanol and benzene or ethanol and benzene, further in aqueous alkalies such as sodium or potassium hydroxide or sodium carbonate solution. Films and coatings may be produced from solutions containing volatile solvents by evaporation of the latter. In this manner, the new polycarbonic acid esters may be used, for example, for the production of coatings on drugs which are intended to become active only in the pH range of the digestive tract.

The following examples are given for the purpose of illustrating the invention.

*Example 3*

Into a solution of 79 parts of 4,4'-dihydroxy-3,3'-di-dimethyl-5,5'-dicarboxydiphenylene-methane, 100 parts of pyridine and 600 parts of methylene chloride, there are introduced with stirring 24.6 parts of phosgene at about 0° C. within 1½ hours. After stirring overnight at room temperature, the solution is treated with 50 parts of water, stirred for 2 minutes and after the addition of 450 parts of 2 N hydrochloric acid stirred for a further 15 minutes. Methylene chloride is subsequently distilled off under vacuum with stirring and the residue is filtered off. The residue remaining after filtration is washed with water until free from chlorine and dried under vacuum at 80° C.

The dry product dissolves, for example, in sodium hydroxide or sodium carbonate solution and also in organic solvents such as acetone, tetrahydrofurane, dioxane, dimethyl formamide, or mixtures of methanol and benzene or ethanol and benzene.

Clear films are obtained from organic or aqueous organic solutions after evaporation of the solvent.

*Example 4*

To a mixture of 17.65 parts of 2,2-(4,4'-dihydroxy-diphenylene)-propane-bis-chlorocarbonic acid ester, 15.15 parts of 4,4'-dihydroxy-3,3'-dicarboxy-5,5'-dimethyl-diphenylene-methane and 350 parts of methylene chloride there is added dropwise with stirring at about 0° C. within 30 minutes a solution of 23.7 parts of pyridine in 40 parts of methylene chloride. After stirring overnight at room temperature, the mixture is acidified with dilute hydrochloric acid and methylene chloride evaporated with stirring in vacuo. After filtration of the residue, the filter residue is washed first with hydrochloric acid and subsequently with water until no further chlorine is detectable in the wash water. The filter residue is dried at 80° C. under vacuo.

The dry product shows similar solubilities to those of the product described in Example 3.

Clear films are obtained from organic or aqueous organic solutions after evaporation of the solvent.

*Example 5*

Into a solution of 32.3 parts of 2,2-[4,4'-dihydroxy-diphenylene-disulphonic acid-(3,3')]-propane, 19 parts of 2,2-(4,4'-dihydroxy-diphenylene)-propane, 67 parts of pyridine and 330 parts of methylene chloride, a solution of 16.5 parts of phosgene in 130 parts of methylene chloride is dropped during 60 minutes at 0° C. under stirring. The stirring of the reaction is then continued for 10 hours at room temperature. Thereafter the reaction mixture is acidified with dilute hydrochloric acid and the methylene chloride evaporated in vacuo. The precipitated polycarbonate is washed neutral with water, and dried at 80° C. in vacuo.

The product is soluble in some organic solvents such as acetone, tetrahydrofurane and methanol and ethanol water mixtures, furthermore in diluted sodium hydroxide and sodium carbonate solution.

From organic or aqueous organic solutions there may be produced clear films by evaporating the solvents.

We claim:
1. A high molecular weight linear film-forming polycarbonate which is soluble in aqueous alkali and which consists essentially of recurring units having one of the formulae:

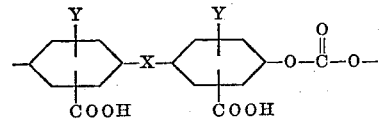

and

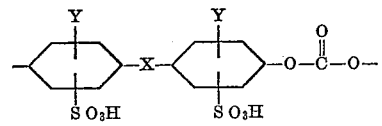

wherein X is selected from the group consisting of alkylene and sulfonyl and Y is selected from the group consisting of hydrogen and alkyl.

2. The composition of claim 1 wherein the polycarbonate also contains units of the formula:

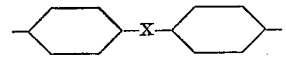

where X is alkylene.

3. The composition of claim 1 wherein said recurring units have the formula:

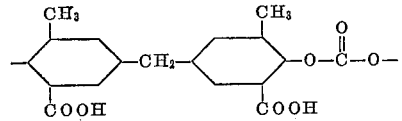

4. The composition of claim 1 wherein said recurring units have the formula:

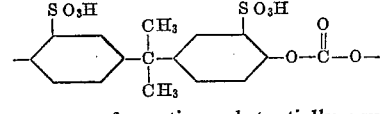

5. In a process of reacting substantially equimolecular proportions of an organic dihydroxy compound with a compound selected from the class consisting of phosgene and a bis-chloro-carbonic acid ester of an organic dihydroxy compound at a temperature from about 0–100° C. to obtain a high molecular weight linear film-forming alkali-soluble polycarbonate in which the essential recurring unit is

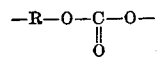

R having the formula

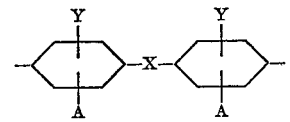

where X is selected from the group consisting of alkylene and sulfonyl, Y is selected from the group consisting of hydrogen and alkyl, and A is selected from the group consisting of COOH and $SO_3H$, the improvement wherein at least 50 mol. percent of said organic dihydroxy compound has the formula:

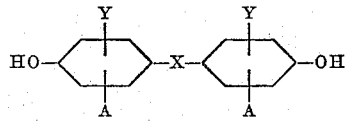

wherein X and Y have the same meanings as in the previous formula.

6. Process of claim 5 wherein the R is di-(carboxyarylene)alkylene.

7. Process of claim 5 wherein the R is di-(sulfoxyarylene)alkylene.

8. Process of claim 5 wherein R has the formula:

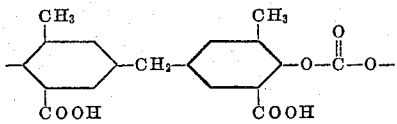

9. The process of claim 7 wherein from 0–50% of the organic dihydroxy compounds are selected from the class consisting of saturated aliphatic, cycloaliphatic, and aromatic diols which are free of carboxyl and sulfonic acid groups, the aliphatic diols containing up to 10 carbon atoms.

References Cited in the file of this patent

UNITED STATES PATENTS

| 2,455,653 | Bralley et al. | Dec. 7, 1948 |
| 2,833,744 | Neher | May 6, 1958 |
| 2,887,468 | Caldwell | May 19, 1959 |

FOREIGN PATENTS

| 372,933 | Germany | Apr. 3, 1923 |
| 532,543 | Belgium | Oct. 30, 1954 |
| 546,375 | Belgium | Mar. 23, 1956 |

OTHER REFERENCES

Organic Synthesis, vol. 37, page 21.
Chemische Berichte, 42, page 2557. (Copy in Lib.)